ial part of this disclosure:

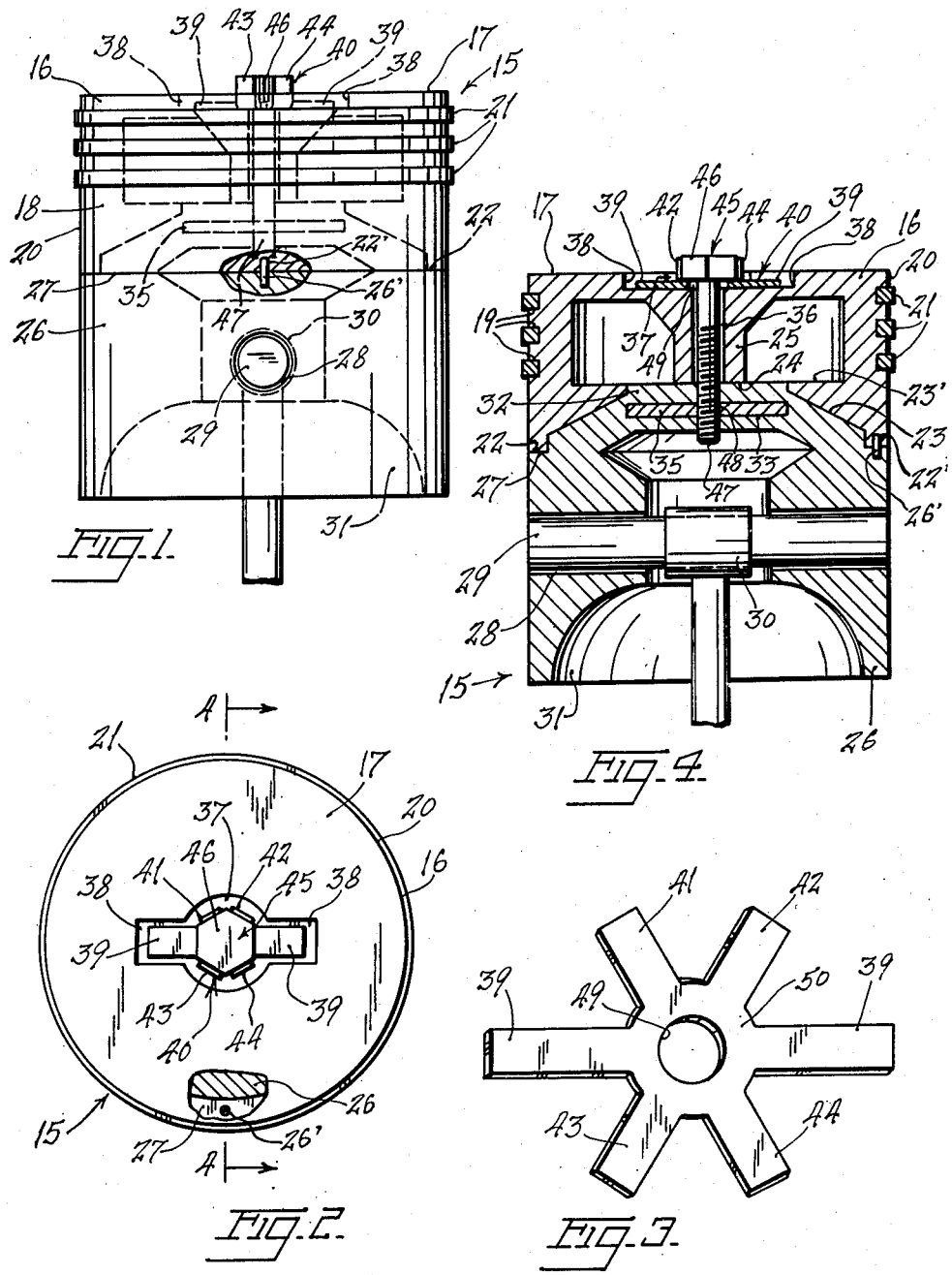

United States Patent Office 2,783,105
Patented Feb. 26, 1957

2,783,105

QUICK RE-RING PISTON

Herman Kopp, Bronx, N. Y.

Application May 24, 1955, Serial No. 510,800

3 Claims. (Cl. 309—15)

This invention relates to new and useful improvements in quick re-ring pistons such as those for an internal combustion engine.

More particularly, the present invention proposes the construction of an improved quick re-ring piston having a base member and a head member containing grooves for piston rings and which can easily and quickly be secured to and removed from the base member for re-ringing.

As a further object, the present invention proposes forming the head and base members so that they can be connected and held together by a single screw the head of which is easily accessible at the top of the head member.

Still further, the present invention proposes constructing the base member with a steel plate cast in the member and having a threaded opening to receive one end of the screw when the head of the screw is bearing against the head member.

Another object of the invention proposes forming the head member with a countersunk recess in the center of its top wall and a milled slot extending across the recess and providing a lock plate having legs adapted to seat in the slot and short ends bendable up against the flat sides of the screw head to keep the screw from turning once it has joined the head and base members together.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side view of a quick re-ring piston constructed and arranged in accordance with the present invention.

Fig. 2 is a top plan view of the structure shown in Fig. 1.

Fig. 3 is a perspective enlarged view of a locking plate to lock the screw shown in Figs. 1 and 2.

Fig. 4 is a sectional view taken on line 4—4 of Fig. 2.

Referring more particularly to the drawings, the quick re-ring piston of the present invention is designated generally by the reference numeral 15.

Piston 15 has a cylindrical head member 16 with an integral top wall or top wall portion 17 and a skirt or skirt portion 18. The head member 16 is substantially hollow like a cap and contains circumferential grooves 19 on its outer side 20 for piston rings 21.

Head member 16 also contains a tongue portion 22 on the lower edge of the skirt or skirt portion 18 and inside the head member an inwardly projecting flange 23 extends toward the lower end 24 of a downwardly directed sleeve 25, the upper surface 23' of the flange 23 being aligned with and on the same level as the lower end 24 of sleeve 25.

A cylindrical base member 26 is provided having a grooved upper peripheral edge 27 to mate with the tongue portion 22 on the lower edge of the skirt portion 18 of the cylindrical head member 16. The two cylindrical members 16 and 26 are of the same diameter. At least one lock pin 26' projects from the upper surface of peripheral edge 27 of the base member into a socket opening 22' in the head member 16 in order to prevent relative rotation of the head and base members.

Base member 26 also is substantially hollow inside and is provided with a transverse wrist pin opening 28 for a wrist pin 29 which extends through a connecting rod 30 centrally disposed in the inner cavity or chamber 31 of the base member 26.

Base member 26 has a top or upper wall portion 32 with a centrally disposed recess 33 to seat a plate 35. The plate 35 preferably is a steel plate cast into the base member 26, which member may be of cast iron or aluminum.

The cylindrical head member 16 has a smooth-walled screw opening 36 centrally disposed in and extending through the top wall portion 17 and axially through the sleeve 25. The top of the wall portion 17 around opening 16 is milled out providing a central recess 37 and an elongated slot 38 in this central recess of the head member adapted to receive and seat the legs 39 of a lock plate 40.

Lock plate 40 also has a plurality of short ends 41, 42, 43 and 44 which are stiff but bendable upwardly and downwardly.

A screw 45 removably extends through the opening 36 in the head member 16. Screw 45 has a hexagonal head 46, as shown, and a threaded end 47.

Plate 35 embedded in base member 26 has a threaded central opening 48 removably to receive the threaded end 47 of the screw 45 when the head 46 of the screw is seated in the countersunk recess 37 in the top wall portion 17 of the head member 16.

The lock plate 40 is adapted for its legs 39 to be seated in the slot 38 in the top wall portion 17 of head member 16 and for the screw 45 to extend through the central opening 49 in the lock plate with the head 46 of the screw resting on the top surface 50 of the lock plate. The short ends 41, 42, 43 and 44 are bendable upwardly against the sides of the head 46 of screw 45 when the screw has been put in place and tightened to hold the two members 16 and 26 together. The short ends 41, 42, 43 and 44 when so bent will lock and prevent the screw from turning.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A quick re-ring piston comprising a cylindrical head member having integral top wall and skirt portions and being circumferentially grooved for piston rings, a cylindrical base member for a wrist pin and a connecting rod, a fastening screw centrally disposed in and extending through the top wall portion of the cylindrical head member, and means in the base member removably to receive said screw for the screw removably to hold the two members together, said means being a plate secured to the base member with a threaded opening therein for one end of said screw, said plate being cast in the base member, said top wall portion of the cylindrical head member having a centrally disposed countersunk recess with a slot therein and extending at opposite sides of said recess and a lock plate removably seated in said slot to prevent said screw from unscrewing, said screw having a polygonal-shaped head and said lock plate having a plurality of short ends bendable against the sides of said head of the screw to prevent the screw from turning.

2. A quick re-ring piston comprising a cylindrical head member having integral top wall and skirt portions and being circumferentially grooved for piston rings, a cylindrical base member for a wrist pin and a connecting rod, a fastening screw centrally disposed in and extending through the top wall portion of the cylindrical head member, and means in the base member removably to receive said screw for the screw removably to hold the two members together, said top wall portion of the cylindrical head member having a centrally disposed countersunk recess with a slot therein and extending at opposite sides of said recess and a lock plate removably seated in said slot to prevent said screw from unscrewing, said screw having a polygonal-shaped head and said lock plate having a plurality of short ends bendable against the sides of said head of the screw to prevent the screw from turning, said lock plate also having two legs adapted to fit into said slot.

3. A quick re-ring piston comprising a cylindrical head member having integral top wall and skirt portions and being circumferentially grooved for piston rings, a cylindrical base member for a wrist pin and a connecting rod, a fastening screw centrally disposed in and extending through the top wall portion of the cylindrical head member, and means in the base member removably to receive said screw for the screw removably to hold the two members together, said means being a plate secured to the base member with a threaded opening therein for one end of said screw, said plate being cast in the base member, said top wall portion of the cylindrical head member having a centrally disposed countersunk recess with a slot therein and extending at opposite sides of said recess and a lock plate removably seated in said slot to prevent said screw from unscrewing, said screw having a polygonal-shaped head and said lock plate having a plurality of short ends bendable against the sides of said head of the screw to prevent the screw from turning, said lock plate also having two legs adapted to fit into said slot.

References Cited in the file of this patent
UNITED STATES PATENTS

| | | |
|---|---|---|
| 1,322,748 | Bachman | Nov. 25, 1919 |
| 1,522,458 | Jackson et al. | Jan. 6, 1925 |
| 1,528,182 | Boyer | Mar. 3, 1925 |
| 1,553,548 | Nagel et al. | Sept. 15, 1925 |
| 1,589,069 | Godstrey et al. | June 15, 1926 |
| 2,028,799 | O'Connor | Jan. 28, 1936 |